United States Patent
Pickett

(10) Patent No.: US 10,705,893 B1
(45) Date of Patent: Jul. 7, 2020

(54) COMMAND LINE INTERFACE MODIFICATIONS

(71) Applicant: Hewlett Packard Enterprise Development LP, Houston, TX (US)

(72) Inventor: Seth Pickett, Ft. Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 16/283,065

(22) Filed: Feb. 22, 2019

(51) Int. Cl.
 *G06F 9/54* (2006.01)
 *G06F 9/451* (2018.01)

(52) U.S. Cl.
 CPC .............. *G06F 9/543* (2013.01); *G06F 9/451* (2018.02)

(58) Field of Classification Search
 None
 See application file for complete search history.

(56) References Cited

U.S. PATENT DOCUMENTS

| | | | |
|---|---|---|---|
| 7,177,924 B2 | 2/2007 | Murray et al. | |
| 7,653,880 B2 | 1/2010 | Peters et al. | |
| 8,583,835 B1 * | 11/2013 | Kan | ...................... G06F 3/0622 710/5 |
| 9,449,044 B1 | 9/2016 | Little et al. | |
| 9,722,879 B1 | 8/2017 | Muthu et al. | |
| 2005/0118996 A1 * | 6/2005 | Lee | ........................ G06F 3/011 455/425 |
| 2008/0222618 A1 * | 9/2008 | Valtchev | ................. G06F 9/542 717/139 |
| 2017/0270091 A1 | 9/2017 | Singh et al. | |

OTHER PUBLICATIONS

Cao, X.; "Evaluation of an On-line Adaptive Gesture Interface with Command Prediction"; Mar. 7, 2005; 8 pages.
Cloud Found Dry; "Deploying with Application Manifests"; printed on Aug. 27, 2018 from webpage: https://docs.cloudfoundry.org/devguide/deploy-apps/manifest.html; 13 pages.
Miller, R. et al.; "Inky: a Sloppy Command Line for the Web with Rich Visual Feedback"; Apr. 5, 2008; 10 pages.

* cited by examiner

*Primary Examiner* — Craig C Dorais
(74) *Attorney, Agent, or Firm* — Brooks, Cameron & Huebsch, PLLC

(57) ABSTRACT

Examples described herein relate to a system consistent with the disclosure. For instance, the system may comprise a memory resource, a processing resource, and a database to collect command code information for a command line interface of a client device included in a plurality of client devices, analyze the command code information, modify a command code based on the command code information, and send the modified command code to of the plurality of client devices to cause a modified output responsive to execution of the command code on the plurality of client device.

18 Claims, 5 Drawing Sheets

COMMAND LINE INTERFACE MODIFICATIONS

BACKGROUND

Command line interface is a computer program on a computing device that may allow for the execution of command code, Command line interface may permit a user to execute an operation using command code, by entering successive lines of text on a computing device.

DETAILED DESCRIPTION

Systems utilizing a command line interface may provide feedback to a user based on a particular command code entered into a computing device. Some systems may have preset responses programmed based on command code entered in a computing device. Command line interface systems may include a set of preset responses that may be provided to the user responsive to a command code being entered.

However, command line interface systems with preset responses may not provide proactive assistance to users during the entering and executing of command code. That is, using a command line interface with preset responses provides the user with static response that are unable to update and/or change as threats, errors, and systems update and/or change. In order to update some command line interface systems, a user would have to load a new version of preset response into the command line interface system.

As such, command line interface modifications, as described herein, may include a memory device, a processing resource, and a database to collect command code information for a command line interface of a client device, analyze the command code information, modify a command code based on the analyzed command code information, and send the modified command code to a client device to cause a modified output when a command code is executed on a client device. Modifying command code and sending the modified command code to the client device may provide proactive assistance to the user when using command line interface and/or may mitigate/prevent a user from executing commands that may threaten the client device.

Figure 1:
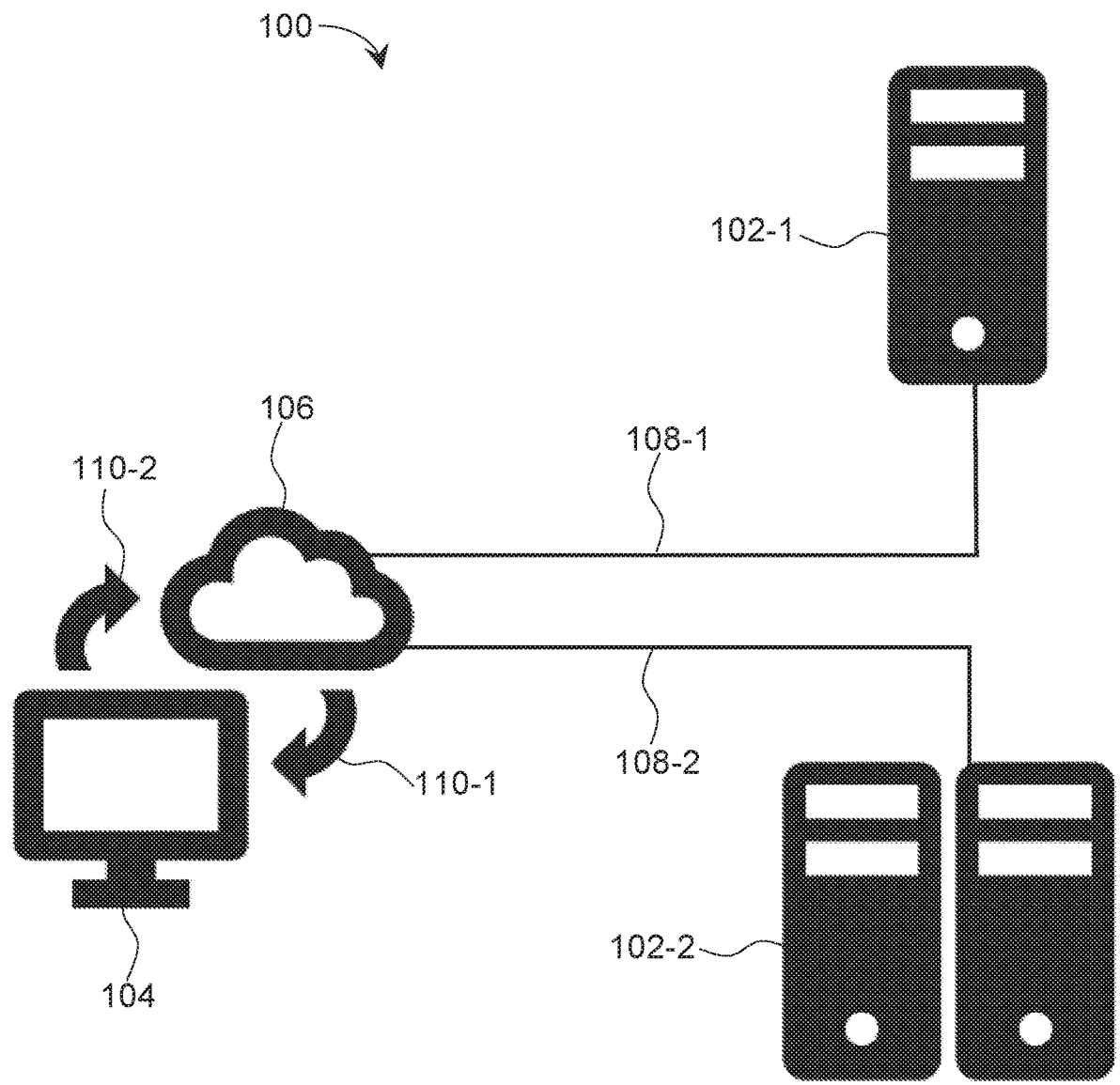
FIG. 1 illustrates an example of a system consistent with the disclosure.

FIG. 1 illustrates an example of a system 100 consistent with the disclosure. The system 100 may include a client device 102-1. As used herein, "client device" refers to computer hardware and software that accesses a service made available by a computer system. In some examples, the system 100 may include a plurality of client devices 102-1 and 102-2 (collectively referred to as client device 102) connected to a database 104. That is, the client device 102 may be an individual client device, as illustrated by client device 102-1. In addition, the client device 102 may be a group of connected client devices, as illustrated by client device 102-2.

In some examples, a user may use command line interface to enter a command code into a client device 102. For example, the user may enter command codes into the client device 102 in the form of successive lines of text. However, the disclosure is not so limited. For instance, a user may select a graphical icon corresponding to a command code, speak a predetermined phrase corresponding to a command code, or otherwise select/enter a command code into a client device.

In some examples, the client device 102 may send command code information to a database 104. As used herein, a "database" refers to a computing system that may collect and store data (e.g., command code information). For instance, the client device 102 may send the command code information to a cloud computing resource 106 and the database 104 may retrieve the command code information from the cloud computing resource 106. That is, the cloud computing resource 106 may be commutatively coupled to the database 104. As used herein, "commutatively coupled" refers to various wired and/or wireless connections between devices and/or systems such that data and/or signals may be transferred in various directions between the devices and/or systems. As used herein, "command code information" refers to information related to command code entered into a client device. For example, the command code information may be information that identifies errors that occur when a command code is entered, identifies user error associated with a command code, identifies common typing errors when a command code is entered, amongst other similar information.

The cloud computing resource 106 may send data and/or command code information to the database 104 through a connection represented by arrow 110-1. In some examples, the database 104 may be connected to a plurality of client devices 102 through the cloud computing resource 106. For example, the database 104 may be connected to an individual client device (e.g., client device 102-1) and a group of client devices (e.g., client device 102-2) simultaneously. The individual client device 102-1 and the group of client device 102-2 may not be connected to each other without the database 104. The client devices 102-1 and 102-2 may send data and/or command code information to the database 104 separately.

For example, client device 102-1 may send the command code information entered into client device 102-1 to the database 104 via cloud computing resource 106 through connection 108-1. Similarly, client device 102-2 may send the command code information entered into client device 102-2 to the database 104 via cloud computing resource 106 through connection 108-2. Connection 108-1 and 108-2 may be a wireless connection and/or a wired connection. That is, the client device 102 may be commutatively coupled to the database 104 through connection 108-1 and/or 108-2 (collectively referred to as connection 108) via the cloud computing resource 106. The client device 102 being communicatively coupled to the database 104 may allow each client device (e.g., client device 102-1 and/or client device 102-2) to send data and/or command code information entered on each respective client device (e.g., client device 102-1 and/or client device 102-2) to the database 104.

In some examples, the database 104 may analyze a plurality of command code information received form a plurality of client devices 102-1 and/or 102-2. That is, each client device 102 may send command code information to the database 104 through connection 108 and the database 104 may analyze each received command code information separately. As used herein, "analyze" refers to the act of interpreting data and/or information. The database 104 may analyze the information to find errors in the information, potential updates based on the information provided to the database 104, identify command codes with malicious content, and/or ways to update the command code of each respective client device 102. As used herein, "malicious command code" refers to command code that may cause harm to a client device and/or system.

In some examples, the database 104 may modify a command code based on the analyzed command code information. The modified command code may provide the client device 102 with updated information and an updated response when command code is entered in a client device 102. The updated information (e.g., modified command code) may provide the client device 102 with a command line interface with the ability to identify command code error as the user enters the command code and/or prevents the malicious command code from being executed. That is, the modified command code may provide an updated response that may cause the client device 102 to prevent malicious command code from being executed by the client device 102. As used herein, a "modify" refers to the process of making partial changes to command code.

In some examples, the database 104 may send the modified command code to the client device 102. That is, the database 104 may send the command code to the cloud computing resource 106 through a connection represented by arrow 110-2. The database 104 may be connected to each individual client device 102-1 and/or 102-2 through the cloud computing resource 106 via connections 108-1 and/or 108-2. The database 104 may use connection 108 to send updated information (e.g., modified command codes) to the client device 102 via the cloud computing resource 106. In some examples, the database 104 may analyze information from each respective client device 102-1 and/or 102-2 and modified command code based on the analyzed information. The database 104 may then send each modified command code, based on the information received by all client devices 102-1 and 102-2, to all of the client devices 102-1 and/or 102-2 connected to the database 104. That is, each client device 102 is updated based on the information it sends to the database 104 and the information sent to the database 104 by other client devices. For example, client device 102-1 may be updated based on information sent to the database 104 from client device 102-2.

Figure 2:
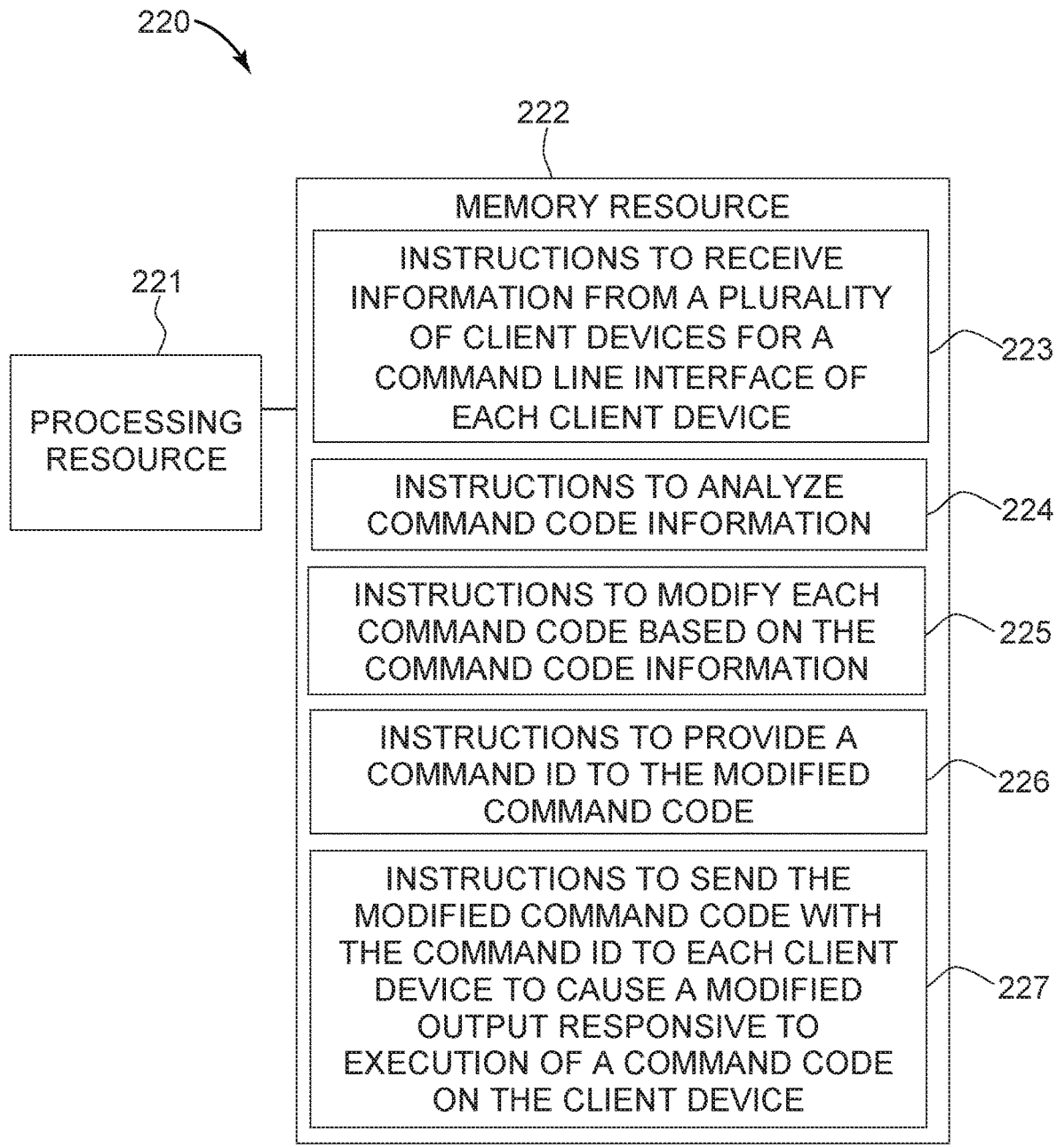
FIG. 2 illustrates an example of an apparatus suitable with a system consistent with the disclosure.

FIG. 2 illustrates an example of an apparatus 220 suitable with a system consistent with the disclosure. As illustrated in FIG. 2, the apparatus 220 includes a processing resource 221 and a memory resource 222. The processing resource 221 may be a hardware processing unit such as a microprocessor, application specific instruction set processor, coprocessor, network processor, or similar hardware circuitry that may cause machine-readable instructions to be executed. In some examples, the processing resource 221 may be a plurality of hardware processing units that may cause machine-readable instructions to be executed. The processing resource 221 may include central processing units (CPUs) among other types of processing units. The processing resource 221 may also include dedicated circuits and/or state machines, such as in an Application Specific Integrated Circuit (ASIC), Field Programmable Gate Array (FPGA) or similar design-specific hardware.

The memory resource 222 may be any type of volatile or non-volatile memory or storage, such as random-access memory (RAM), flash memory, read-only memory (ROM), storage volumes, a hard disk, or a combination thereof. The memory resource 222 may store instructions thereon, such as instructions 223, 224, 225, 226, and 227, When executed by the processing resource 221, the instructions may cause the apparatus 220 to perform specific tasks and/or functions. For example, the memory resource 222 may store instructions 223 which may be executed by the processing resource 221 to cause the apparatus 220 to receive command code information from a plurality of client devices for a command line interface of each client device of the plurality of client devices.

In some examples, the database may collect command code information from a plurality of client devices. The client devices may send command code information to the database on a substantially continuous basis. As used herein, "continuous" refers to data and/or information sent without or with minimal interruptions. As used herein, the term substantially intends that the characteristic does not have to be absolute but is close enough so as to achieve the characteristic. For example, "substantially continuous" is not limited to absolutely continuous. For instance, the client devices may send command code information to the database as command code is entered into the client device. However, this disclosure is not so limited. In some examples, the client device may send command code information to the database regularly. For example, the client device may send command code information to the database every minute, hour, day, week, or a combination thereof.

The memory resource 222 may store instructions 224 which may be executed by the processing resource 221 to cause the apparatus 220 to analyze command code information received from the plurality of client devices. The database may analyze each command code information to determine possible modifications that may be made to the command code. In some examples, the database may analyze command code information and modify the command code based on the analysis.

The memory resource 222 may store instructions 225 which may be executed by the processing resource 221 to cause the apparatus 220 to modify each command code based on the command code information. In some examples, the database may create a modified output based on the analyzed command code information. The modified output may be a modified command code to prevent malicious command code from being executed on a client device. For example, if a user enters a command code or a portion of a command code that is deemed malicious, based on the modified command code, the client device may prevent the command code from being executed.

The memory resource 222 may store instructions 226 which may be executed by the processing resource 221 to cause the apparatus 220 to provide a command identification (ID) to the modified command code. In some examples, the command ID may link the modified command code to command codes entered on a client device. For example, when a user enters a command code on the client device, the modified command code may recognize the command code based on the command ID. The client device may then provide feedback/suggestions to the user based on the modified command code. For instance, when a user enters a malicious command code, the client device may prevent the user from executing the command code based on the modified command code.

The memory resource 222 may store instructions 227 which may be executed by the processing resource 221 to cause the apparatus 220 to send the modified command code with the command ID to each client device to cause a modified output responsive to execution of a command code on the client device, wherein the modified output is to prevent a malicious command code from being executed by the client device, notify the client device that a malicious command code has been entered, or a combination thereof. In some examples, the database may modify command codes based on command code information received from a plurality of client devices. The database may send all modified command codes to each client device connected to the database.

Modifying command codes and sending the modified command code to each client device allows the client device to provide updated feedback to the user based on the current threats, common user errors, detected command code errors, and other similar information. For example, when a command is found to be malicious (e.g., a command code causing harm to the information in the client device by leaking memory when executed) the modified command code sent to the client device may blacklist and/or disable the malicious command code and remove the ability for the client device to complete or execute the command. The client device may notify the user why the command cannot be executed and provide alternative command codes to the user. Hence, the modified command code may include a modification to cause an updated response prompting the client device to notify the user when a malicious command code is entered into the client device. Notifying the user that a malicious command code has been entered may allow a user to take action to prevent damage from the malicious command code by executing an alternative command, for example. As used herein, "blacklist" refers to a list of command codes that are untrustworthy and/or harmful and may be avoided and/or prevented from being executed.

Figure 3:
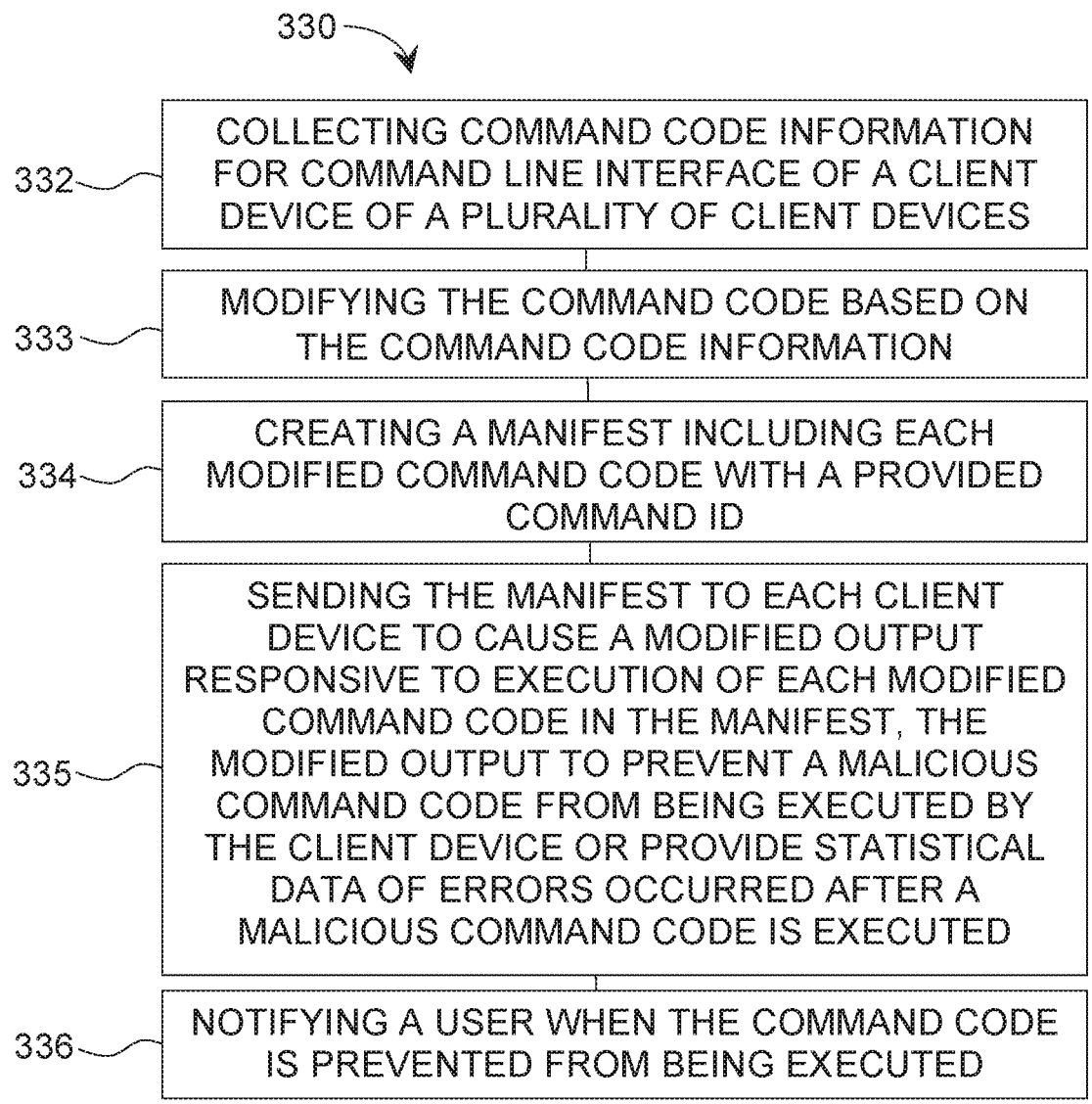
FIG. 3 illustrates an example of a method consistent with the disclosure.

FIG. 3 illustrates an example of a method 330 consistent with the disclosure. Method 330 may be performed, for example, by a processing resource (e.g., processing resource 221 of FIG. 2) of apparatus (e.g., apparatus 220 of FIG. 2). The method 330 may be performed with more or less elements.

At 332, the method 330 may include collecting command code information for command line interface of a client device of a plurality of client devices. Each client device connected to the database may provide the database with new command code information that another client device has not yet experienced. Collecting command code information from a plurality of client devices may allow a client device to provide feedback to a user based on the experiences of other client devices and/or users. In addition, collecting command code information may prevent the execution of malicious command codes.

At 333, the method 330 may include modifying the command code based on the command code information collected from the plurality of client devices. The database may analyze the command code information to determine what changes should be made to provide feedback to a user during command line interface. The database may modify command codes based on the analysis of the command code information received from the client devices.

At 334, the method 330 may include creating a manifest including each modified command code with a provided command ID. In some examples, the database may give each modified command code a command ID to link the modified command code to a command code a user may enter on the client device. The database may aggregate all the modified command codes with their respective command ID into a manifest. Aggregating the modified command codes into a manifest may allow the database to send the modified command code to the client device quicker as compared to sending each modified command code individually. As used herein, "manifest" refers to a file containing a set of data used to update a program.

At 335, the method 330 may include sending the manifest to each client device to cause a modified output responsive to execution of each modified command code in the manifest, the modified output to prevent a malicious command code from being executed by the client device, provide statistical data of errors occurred after a malicious command code is executed, or a combination thereof. Some command line interface systems may have a preset response to entered command codes. However, sending a manifest with a modified command code to each client device may change the preset response to certain command codes entered by a user.

For example, when a malicious command code is entered the client device may prevent and/or stop the execution of the command, based on the updated response provided by the modified command code. In some examples, the client device may provide the user with the percentage of malfunctions that occurs after a particular command is executed, based on the modified command code, to prevent the user from executing a command.

At 336, the method 330 may include notifying a user when the command code is prevented from being executed. In some examples, the client device may notify the user that a command has been prevented from being executed due to the malicious content in the command. In some examples, the client device may inform the user that an entered command code may contain malicious content and ask the user if they would like to execute the command despite the malicious content.

Figure 4:
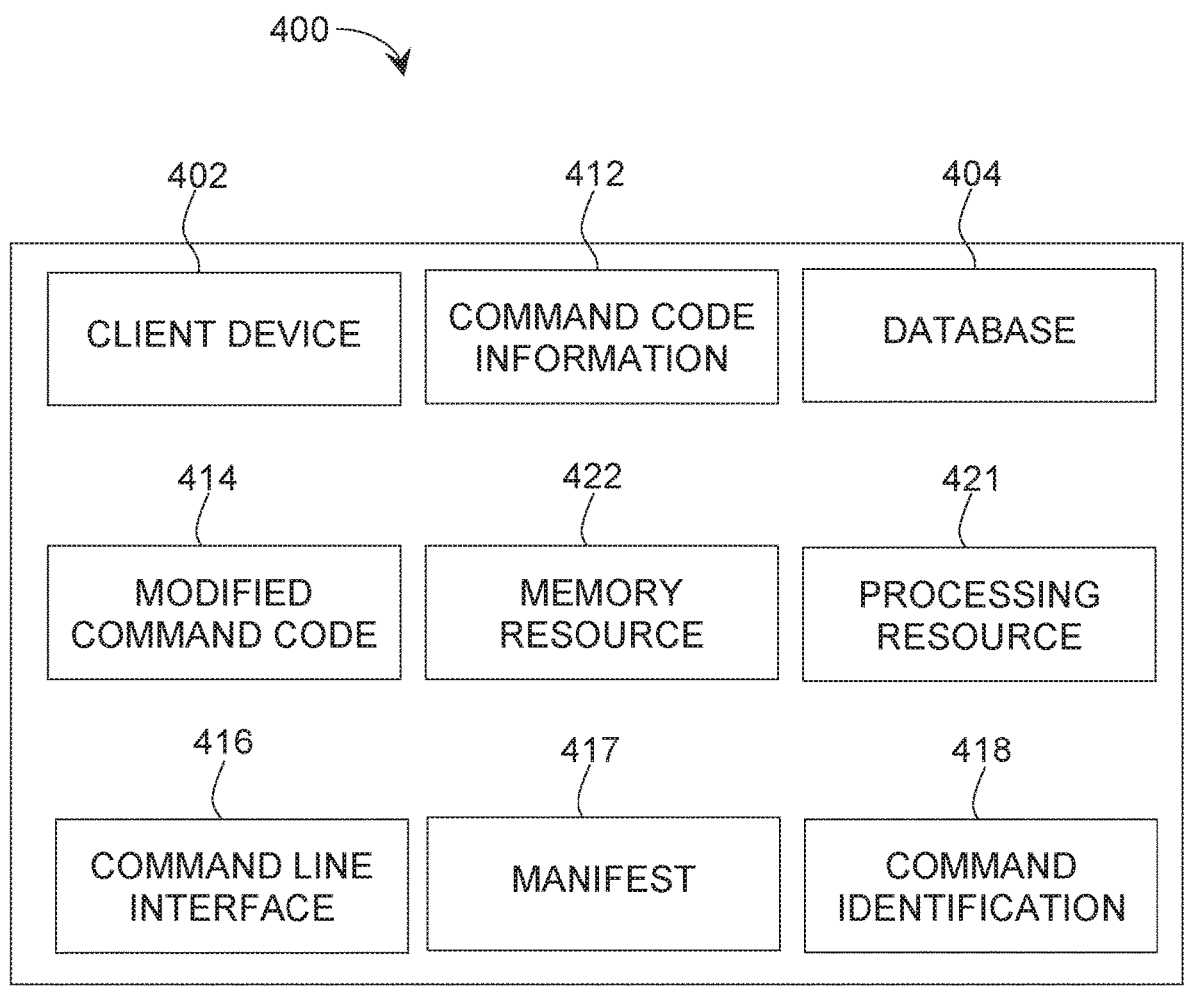
FIG. 4 illustrates an example of a system consistent with the disclosure.

FIG. 4 illustrates an example of a system 400 consistent with the disclosure, System 400 is analogous or similar to system 100 of FIG. 1. Client device 402 is analogous or similar to client device 102 of FIG. 1. Database 404 is analogous or similar to database 104 of FIG. 1.

The system 400 may include a client device 402 or a plurality of client devices (e.g., client device 102-1 and 102-2 of FIG. 1) connected to the database 404. In some examples, the client device 402 may log command code information 412 from a command line interface 416 on the client device 402 and send the logged command to a database 404. That is, as a user enters command code into the client device 402 the client device 402 may log command code information 412 relating to the entered command code to a file and then send the file containing command code information to the database 404. In some examples, the command code information is sent to the database without being logged. For instance, as a user enters command code into the client device 402 the command code information may be sent to the database 404 without being logged. The command code information 412 may be information that identifies errors that occur when a command code is entered, identifies user error when a command code is entered, identifies the particular command the user is typing, amongst other similar information.

In some examples, as the command code information 412 is sent to the database 404, the database 404 may collect the command code information 412. In some examples, the database 404 may include a processing resource 421 and a memory resource 422. The processing resource 421 may cause the database 404 to store the collected command code information 412 on a memory resource 422. The database 404 may then analyze the command code information 412 for user and/or command code errors. In some examples, the client device 102 may send a plurality of command code information 412 to the database 404. That is, the client device 102 may send command code information 412 to the database 404 on a substantially continuous basis. In addition, the database 404 may analyze the command code information 412 on a substantially continuous basis. For instance, the database 404 may analyze each command code information 412 as the command code information 412 is received from the client device 402.

In some examples, the database may be a computing system capable of collecting, analyzing, and modifying data, amongst other things. For example, the database 404 may be a computing device including a processing resource 421 and a memory resource 422. However, this disclosure is not so limited. For instance, the database 404 may be a computer server including a processing resource 421 and a memory resource 422.

In some examples, the processing resource 421 may cause the database 404 to create a modified command code 414 based on the analyzed command code information 412. The modified command code 414 may provide the client device 402 with updated command codes to suggest to the user as the user enters a portion of a command code. In some examples, the modified command code 414 would prompt the client device 402 to send a notification to the user when a malicious command code is entered. In some examples, the modified command code 414 may cause the client device 402 to prevent the user from executing a command. For example, when a user enters a command code or a portion of a command code that has malicious content, the client device 402 may be alerted based on the modified command code 414 and may prevent the user from executing the command. In some examples, the client device 402 may notify a user (e.g., via a display, etc.) that an enter command code has malicious content. The client device 402 may ask the user if the user wants to execute the malicious command code or prevent the user from execute the malicious code.

In some examples, the processing resource 421 may cause the database 404 to add a command ID 418 to the modified command code 414. The command ID 418 may link each modified command code 414 to a command code entered on a client device 402. Linking the modified command code 414 to an entered command code with the command ID 418 may allow the client device 402, including the modified command code 414 to prevent malicious command code from being executed, identify command code error as the user enters a portion of the command code, and/or predict command code the user will enter based on a portion of a command code entered, and/or provide command code suggestions to the user.

In some examples, the database 404 may send the modified command code 414 to the client device 402 in a manifest 417. That is, the database 404 may aggregate all of the modified command code 414 into the manifest 417 and send the manifest to each client device 402 connected to the database 404. In some examples, the database 404 may send the manifest and/or modified command code to the client device 402 on a substantially continuous basis. Sending the manifest and/or modified command code to the client device 402 on a substantially continuous basis may allow for real-time feedback to the user. For instance, sending the manifest and/or modified command code on a substantially continuous basis may allow the preset responses in the command line interface to continuously update. This may provide the user with updated responses for new errors and/or mistakes that may occur. In addition, sending the manifest and/or modified command code on a substantially continuous basis may allow a client device 402 to prevent new malicious command code the user has yet to experience.

Figure 5:
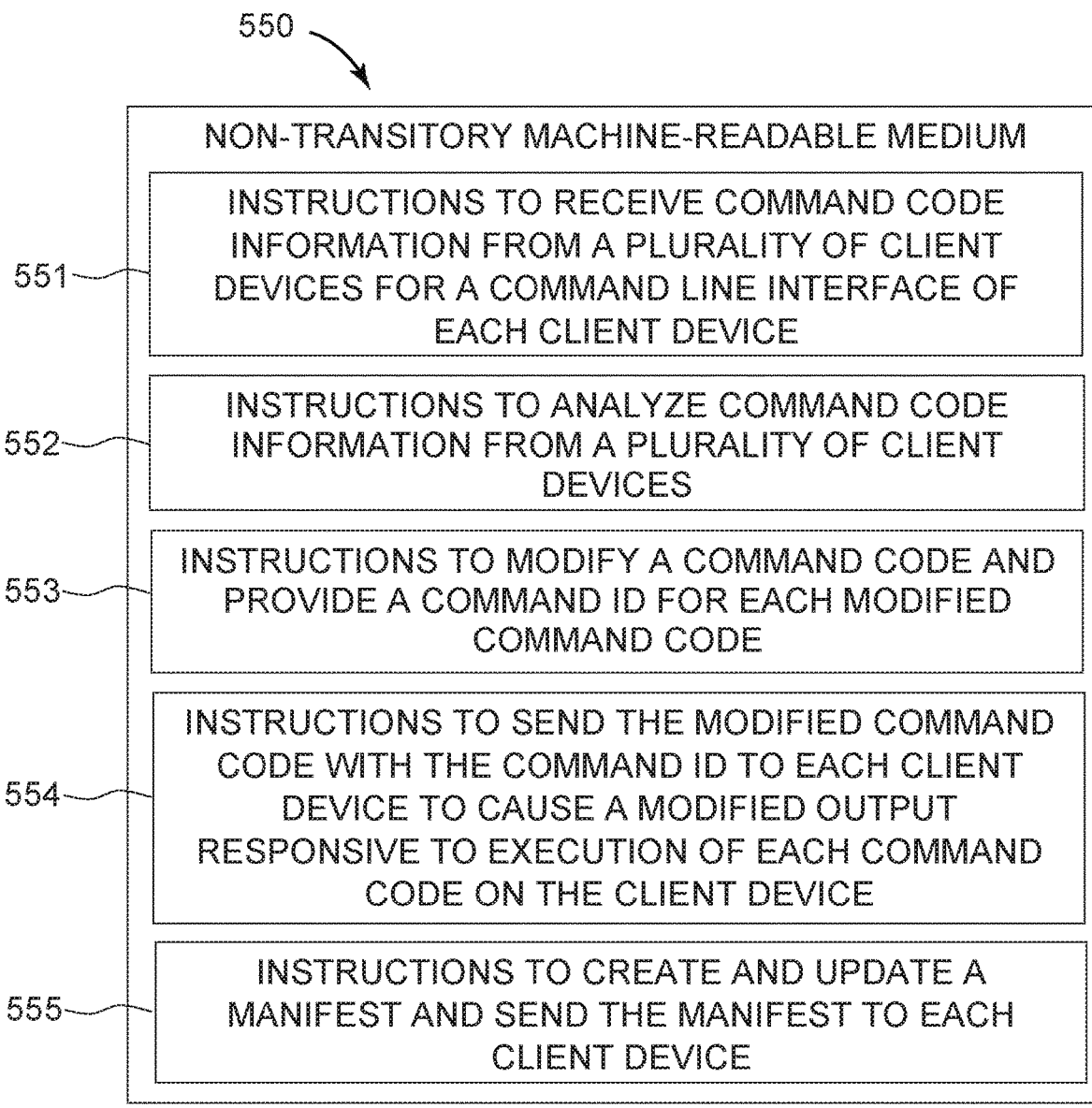
FIG. 5 illustrates an example diagram of a non-transitory machine readable medium suitable with a system consistent with the disclosure.

FIG. 5 illustrates an example diagram of a non-transitory machine readable medium 550 suitable with a system consistent with the disclosure. The non-transitory machine-readable medium 550 may be any type of volatile or non-volatile memory or storage, such as random-access memory (RAM), flash memory, read-only memory (ROM), storage volumes, a hard disk, or a combination thereof.

The medium 550 stores instructions 551 executable by a processing resource to receive command code information from a plurality of client devices for a command line interface of each client device. In some examples, the database may receive command code information from client devices to analyze and produce modified command codes. The client devices may send the command code information to the database at regular scheduled times or on a substantially continuous basis.

The medium 550 stores instructions 552 executable by a processing resource to analyze command code information received from the plurality of client devices. Analyzing the command code information may provide the database with information related to errors and common mistakes made during command line interface. Further, analyzing the command code information may inform the database of threats that occur when certain command codes are executed. By analyzing the command code information, the database may be able to provide real-time feedback to the client device in the form of substantial continuous or regular modified command codes.

The medium 550 stores instructions 553 executable by a processing resource to modify a command code and provide a command ID for each modified command code. In some examples, the database may modify a command code based on analyzed command code information and provide a command ID for the modified command code. The command ID may link the command code on the command line interface of a client device to the modified command code.

The medium 550 stores instructions 554 executable by a processing resource to send the modified command code with the command ID to each client device to cause a modified output responsive to execution of each command code on the client device. In some examples, the modified command code may be sent to each client device to identify errors in command code that is entered into each client device by the user. In some examples, the modified command code may cause each client device to notify the user of errors in command code entered by the user.

The medium 550 stores instructions 555 executable by a processing resource to create and update a manifest and send the manifest to each client device. The manifest may include modified output in the form of modified command codes with a command ID. The modified output may be sent to the client devices to provide the client devices with feedback when command codes are entered into the client device. In some examples, the database may update the manifest on a substantially continuous basis and send the updated manifest to the client device after the manifest is updated.

For example, as new command code information is sent to the database, the database may analyze the command code information and create a modified command code based on the analyzed command code information. Once the modified command code is created the database may update and then send the manifest to the connected client devices. How this disclosure is not so limited. In some examples, the manifest may be updated on a regular basis. For example, the database may update the manifest every minute, hour, day, week,

What is claimed:

1. A system comprising:
   a memory resource;
   a processing resource; and
   a database to:
   collect command code information for a command line interface of a client device included in a plurality of client devices;
   analyze the command code information;
   modify a command code based on the command code information;
   provide a command identification (ID) to each modified command code; and
   send the modified command code to each client device of the plurality of client devices to cause a modified output responsive to execution of the command code on the plurality of client devices, wherein the modified output is to prevent a malicious command code from being executed.

2. The system of claim 1, wherein the modified command code sent to the client device assists in predicting a command code responsive to a portion of a command code being entered in the client device.

3. The system of claim 1, wherein the modified output is determined based on the command ID provided to each modified command code and a linked command code.

4. The system of claim 1, wherein the modified command code sent to each client device is to identify errors in command code entered into each client device.

5. The system of claim 4, wherein the modified command code sent to each client device is to notify the client device of errors in the command code entered into the client device.

6. The system of claim 1, wherein each client device is to send command code information to the database every minute, hour, day, week, or combinations thereof.

7. The system of claim 1, wherein each client device is to send command code information to the database on a substantially continuous basis.

8. The system of claim 1, wherein the database is a computing device connected to the plurality of client devices.

9. A non-transitory machine-readable medium storing instructions executable by a processing resource to;
   receive command code information from a plurality of client devices for a command line interface of each client device of the plurality of client devices;
   analyze the command code information received from the plurality of client devices;
   modify a command code based on the command code information;
   provide a command identification (ID) to the modified command code; and
   send the modified command code with the command ID to each client device to cause a modified output responsive to execution of the command code on the client device, wherein the modified output is to prevent a malicious command code from being executed by the client device, notify the client device that the malicious command code has been entered, or a combination thereof.

10. The non-transitory machine-readable medium of claim 9, further including instructions to create a manifest including each modified command code with the command ID.

11. The non-transitory machine-readable medium of claim 10, further including instructions to send the manifest to each client device.

12. The non-transitory machine-readable medium of claim 11, further including instructions to update the manifest every minute, hour, day, week, or a combination thereof.

13. The non-transitory machine-readable medium of claim 9, wherein each client device incorporates the manifest and uses the manifest to prevent malicious command code from being executed by the client device, notify the client device that a malicious command code has been entered, or a combination thereof.

14. A method comprising:
   collecting command code information for a command line interface of a client device of a plurality of client devices;
   modifying a plurality of command codes based on the command code information collected from the client device;
   providing a command identification (ID) to each modified command code of a plurality of modified command codes;
   creating a manifest including each modified command code with the command ID; and
   sending the manifest to each client device of the plurality of client devices to cause a modified output responsive to execution of a command code in the manifest, the modified output to prevent a malicious command code from being executed by the client device, provide statistical data of errors occurred after the malicious command code is executed, or a combination thereof.

15. The method of claim 14, further comprising collecting command code information with a database, wherein the database is a computer server connected to the plurality of client devices.

16. The method of claim 15, further comprising storing the collected command code in the database.

17. The method of claim 15, further comprising notifying a user when the command code is prevented from being executed.

18. The method of claim 15, further comprising updating the manifest, on a substantially continuous basis, as each command code is modified.

* * * * *